INVENTORS
RICHARD P. SHIVELY
DAVID V. DICKEY
BY
Ernest L. Brown
ATTORNEY

RICHARD P. SHIVELY
DAVID V. DICKEY
INVENTORS

BY

Ernest L. Brown
ATTORNEY

RICHARD P. SHIVELY
DAVID V. DICKEY
INVENTORS

BY

Ernest L. Brown
ATTORNEY

RICHARD P. SHIVELY
DAVID V. DICKEY
INVENTORS

BY
Ernest L. Brown
ATTORNEY

United States Patent Office 3,434,128
Patented Mar. 18, 1969

3,434,128

COINCIDENT CURRENT MEMORY

Richard P. Shively and David V. Dickey, Los Angeles, Calif., assignors to Litton Systems, Inc., Beverly Hills, Calif., a corporation of Maryland Filed Apr. 22, 1966, Ser. No. 544,495
U.S. Cl. 340—174 49 Claims
Int. Cl. G11b 5/44

This invention pertains to a coincident current memory utilizing ferromagnetic storage cores, and more particularly to a novel means for reading information from said memory.

In ferromagnetic core memories, the cores are usually geometrically arranged in a two or three dimensional matrix. Typically the cores are set into one or the other of two remanent flux states which represent the two states of a binary logic system. To read information out of the core, the core is driven—for example—toward the remanent state which represents a "0." A sensing line threading the storage core then receives an induced signal if the core was originally in the remanent state corresponding to a "1." It receives substantially no signal if the core was originally in the remanent state representing a "0." Thus, the core is driven toward its zero condition and the presence or absence of a signal on the sensing line indicates the value of the information which was stored in that particular core. While the information is being read out of the memory, the information in the core is destroyed. The information, therefore, is usually stored in a temporary memory such as a flip flop and is reentered into the core memory.

To drive a core memory matrix in a "coincident current" fashion, the coordinates of the core are usually designated in terms of row, column, and stack (or $x$, $y$, $z$) in a three dimensional matrix and in terms of a row and column (or $x$, $y$) designation in a two dimensional matrix. There are, of course, other ways of factoring or arranging the cores. For example, a three dimensional matrix could be considered to be a plurality of parts of a two dimensional matrix and could be arranged to be addressed in that fashion. In another plan, a two dimensional matrix could be factored into a plurality of two dimension matrices and, although geometrically in substantially the same plane, the cores would be connected as if the various portions of the plane were stacked into a third dimension. For convenience, in this patent application, when a two dimensional matrix is mentioned, what is meant is that two coincident magnetomotive forces of controlled amplitude must be applied to any particular core to change its remanent state, with the added requirement that the presence of only one of the magnetomotive forces does not change the remanent state of that core. Further, for convenience in this application, when a three dimensional matrix is described, what is meant is that any particular core must have three coincident magnetomotive forces of controlled amplitude to change the remanent state of the core, and that the presence of two of these controlled amplitude magnetomotive forces does not change the remanent state of the core.

Similarly, four, five, six, or a plurality of coincident currents could be required to change the remanent state of the core, with the presence of less than the required number of currents failing to change the remanent state.

It must further be recognized that if a core matrix is described as having rows and columns of cores, that the rows and columns may be interchanged because the designation of a "row" or "column" (as well as a "stack" in a three dimensional system) is arbitrary. Further, it must be apparent that although a particular conductor may thread an aligned (or straight line) plurality of cores, and thus thread a geometrical column or row, that if the designer desires, he may select a plurality of cores in an arbitrary fashion, thread all of those selected cores with a given conductor, and designate those geometrically nonaligned cores as a "row," "column" or "stack."

In general, the rows, columns, and stacks may be driven by current drivers which are adapted, through switching means, to be chosen selectively in response to commands from a computer control mechanism. Further, the current sources and switching mechanisms may be—for example—vacuum tubes, transistors, or magnetic amplifiers. It is also within the concept of this invention that they may be row, column, or stack drivers through a transformer mechanism or magnetic core. It is within the concept of this invention, however, that one of the coincident currents of the storage core must be driven by a driving core. Such a driving core is saturated to a predetermined remanent state. When it is desired to transmit a current to a plurality of storage cores, from the driving core, one driving core is transferred or switched from one predetermined remanent state to the other remanent state. The transfer from one remanent state to the other generates a voltage on a conductor which forms a closed loop and which customarily threads one or two predetermined sets of storage cores. A current is caused, by the change in remanent state of the driving core, to pulse through the closed loop.

To sense that a storage core has changed remanent state, i.e. that a "one" was stored in that storage core, in prior art devices a sensing line or conductor customarily threads each of the storage cores. Since there may be many storage cores, the sensing line becomes extremely long which causes excessive noise and signal attenuation upon that sensing line and, because of its extreme length and inductance, causes excessive delay in reading out the information in the storage cores. It has been proposed to divide up the storage cores, to use a number of sensing lines, and to channel these sensing lines through an "OR" gate. Such a mechanism requires an excessive number of input terminals on the "OR" gate and close timing control, thereby making the gate (or gates) difficult to design.

In the device of this invention, the driving core, in one embodiment, has threading therethrough a biasing conductor which carries current from a biasing current source. As long as there are no disturbing magnetomotive forces applied to the driving cores, the driving cores remain in saturation in a predetermined remanent state. Any change in the remanent state of storage cores which are electromagnetically coupled to the driving cores, merely alters the magnetomotive force applied to the driving cores without substantially changing the flux therein. Hence, if one were to sense the voltage across the biasing current source during a change in remanent state in a storage core, one would find substantially no change in voltage. In a similar fashion, if an additional sensing conductor were to thread the driving cores, and the remanent state of one of the storage cores were to change, because the driving cores are in a saturated state, substantially no voltage would be induced into the sensing conductor.

When, however, one of the driving cores has a switching magnetomotive force applied thereto of sufficient magnitude to change the remanent state of that driving core, during the change of remanent state there is substantial change in flux which induces a voltage and current into a closed loop conductor which threads that particular driving core and one or two sets of the storage cores. A coincident current means, which may be several current sources and switching means for channeling current through the storage cores, typically applies sufficient magnetomotive force to a plurality of the storage cores, including at least one storage core in the sets of storage cores which are receiving current from the selected driving core, to cause the remanent state of the one selected storage core to change. When the remanent state of the selected storage core changes, a back-electromotive-force is generated in the loop, which is carrying current from the driving core, to cause, by transformer action, a modification in the rate of change of the flux in the row-select core. That modification generates a voltage, indicating that the storage core has changed remanent state, across the bias current source of the driving cores. Further, should a sensing line be placed in the driving cores, the change in flux due to a change in remanent state in a storage core would cause a voltage to appear on the sensing line or conductor. Thus, a voltage appearing on such a sensing line or across the bias current source indicates that one of the storage cores in a driven set of storage cores has changed remanent state. Since the coincident current means is adapted only to change the remanent state of one particular selected storage core, the storage core which has changed state is immediately identified.

This system is further refined by amplifying the detected voltage (which is merely a measure of the change of flux in the driving cores) across the bias current source or appearing on a separate sensing line, and gating the output to coincide with the application of current from the coincident current source to the storage cores.

Still a further refinement uses a dummy or balancing driving core to cancel out the effect, on the sense line or across the bias source, of voltages generated by changing the remanent state of the driving core. A differential amplifier is used on the output sense line to amplify only signals which are reflected from the storage cores through the driving cores.

Thus, in the device of this invention, a change in remanent state of a storage core is sensed by sensing a rate of change of flux in a driving core, more particularly by sensing voltage across the bias current source applied to the driving core or by sensing the voltage upon a sensing line which threads the driving cores.

It is further to be noted that when prior art sensing lines are used in the storage core matrix to sense changes in flux in the storage cores, the sensing lines have a large number of possible configurations which are adapted to reduce extraneous noise on the sensing line. Similar low noise configurations of sensing lines may be used in the driving cores to sense changes of flux in those cores.

It is therefore an object of this invention to sense changes in the remanent state of a storage core by sensing changes in flux in a driving core which is electromagnetically coupled to the storage core.

It is a more specific object of this invention to sense changes in remanent state of storage cores in a storage core memory, which is driven partially by driving cores, by sensing the change in flux in the driving cores at the time when a change in remanent state in the storage cores is expected.

It is a still more particular object of this invention to sense the change in remanent state of the storage cores by sensing voltages upon a sensing line which threads the driving cores.

It is also a more specific object of this invention to sense changes in remanent state of a storage core in a memory by sensing the changes in voltage across a bias current source which is applied to driving cores that are electromagnetically coupled to the storage cores to be sensed.

It is a more specific object of this invention to achieve the above enumerated objects while balancing out the sensed signals caused by switching the driving core.

Other objects will become apparent from the following description taken in connection with the accompanying drawings in which.

Figure 1:
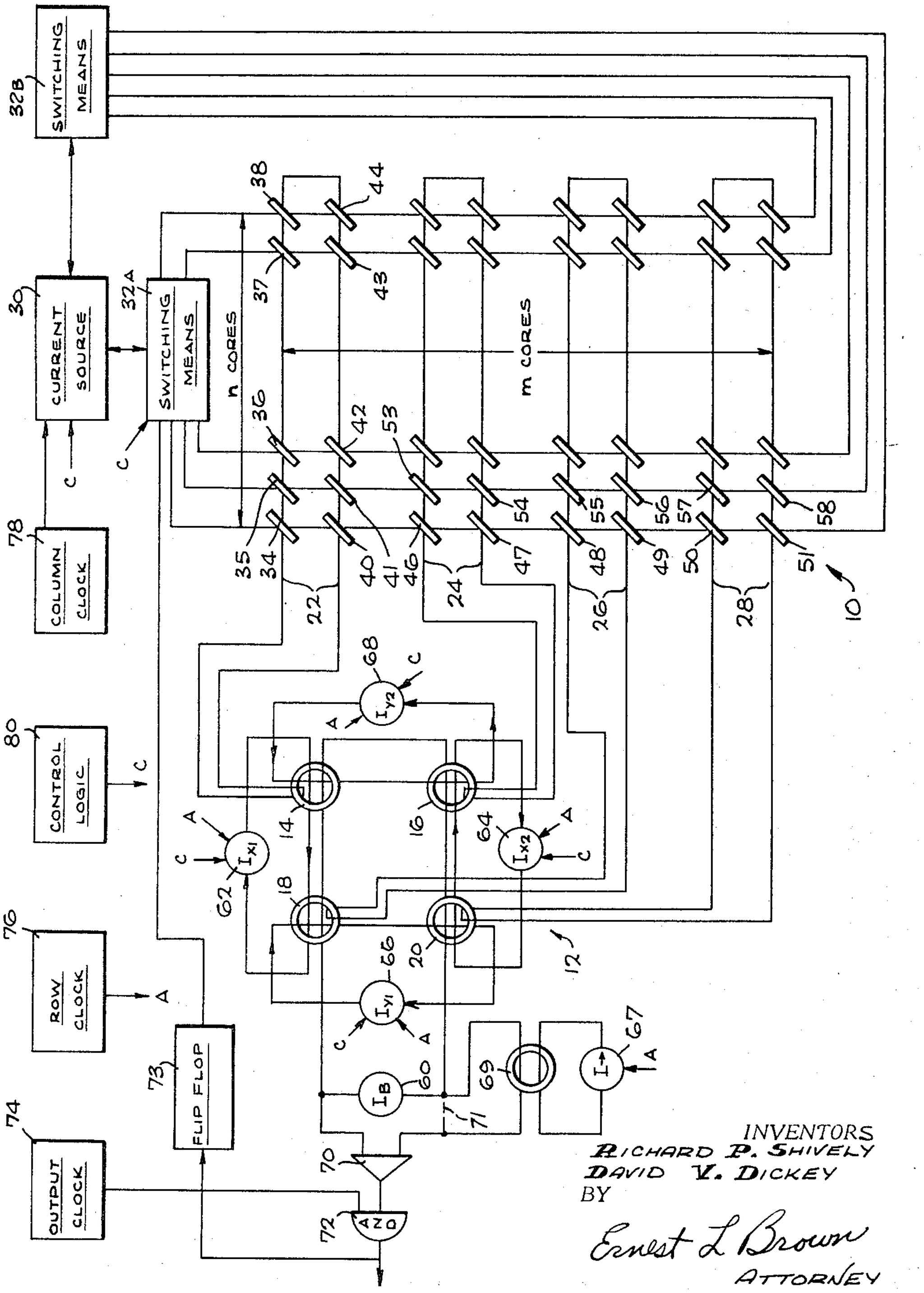
FIGURE 1 is a diagram of a typical storage core matrix in which two sets of storage cores are coupled to each driving core and in which the voltage is sensed across a biasing current source for the driving cores.

Referring to FIGURE 1, a plurality of ferromagnetic storage cores 10 is arranged to have the information in predetermined storage cores read out in response to the coincidence of two driving currents in that core. One of the two driving currents is delivered from one of the plurality 12 of ferromagnetic driving cores, the other of the currents is delivered from a current source 30. The driving cores 12 are adapted selectively to be driven from one remanent state to the other to deliver current pulses selectively to storage cores 10. A sensing means such as amplifier 70 is connected to at least one sensing line which links the flux of the driving cores 12 to sense changes in flux in the driving cores 12, including changes caused by counter electromotive force transmitted from the storage cores 10.

The storage cores 10 may be adapted to be interrogated by the coincidence of more than two currents. It is required in this invention requirement that one of the coincident driving currents must be delivered from the driving cores 12.

In the specific embodiment of FIGURE 1, storage cores 10 are arranged in a two dimensional matrix having "*n*" columns and "*m*" rows. Obviously, the designtaion "column" and "row" could be interchanged.

In the specific embodiment of FIGURE 1, each of the cores of matrix 12 is a ferromagnetic core which is linked to two sets or rows of storage core matrix 10. For example, driving core 14 is linked through a closed loop 22 to two rows of the storage core matrix 10. Similarly, driving core 16 is linked through closed loop 24, driving core 18 is linked through closed loop 26, and driving core 20 is linked through closed loop 28, each to two rows of storage core matrix 10.

In the two dimensional matrix 10 of FIGURE 1, a current source 30 is conneced through switching means **32*a* and 32*b* to the various columns of cores of matrix 10. The current source 30 and switching means 32A and 32B are adapted to drive current in either direction through preselected columns of the storage cores in matrix 10 to select, in combination with the current from driving core matrix 12**, a particular core whose information is to be read out.

In the matrix 10, the sets of storage cores may conveniently be designated as "row sets" and "column sets." For example, cores 34, 35, 36, 37, and 38 form a typical row set of storage cores. Similarly, cores 40, 41, 42, 43, and 44 form a row set of storage cores. Cores 34, 40, 46, 47, 48, 49, 50 and 51 form a column set of storage cores. So to do storage cores 35, 41, 53, 54, 55, 56, 57, and 58 form a column set of storage cores. It is to be noted that the designation of a row set is not limited to five cores, but to "*n*" cores. Further, a column set is not limited to eight cores but to "*m*" cores.

The driving cores 14, 16, 18, and 20 of matrix 12 are biased from the biasing current source 60 which is connected to cause the current therefrom to link all of the driving cores. The driving cores are adapted to be switched by a coincidence of row and column currents. Obviously, other coincident current techniques or combinations could be used. In the combination shown in FIGURE 1, the matrix 12 is divided into rows and columns. For example, the top row of the shown driving cores 18 and 14 is threaded by current from a row current source 62. The driving cores 16 and 20 are threaded by current from a second row current source 64. The driving cores 18 and 20 are threaded by current from a column current source 66, and the driving cores 14 and 16 are threaded by current from a second column current source 68. In a typical embodiment, the current from current sources 62, 64, 66, and 68 is adapted to generate magnetomotive force in opposition to the magnetomotive force generated by current from current source 60. The current sources 62, 64, 66, and 68 could be combined into one mechanism with switching means for selecting the particular driving cores whose remanent state is to be switched.

In the embodiment of FIGURE 1, an amplifier 70 is connected across the biasing current source 60 to sense the voltage across the biasing current source 60. Because the biasing current source 60 is connected to a conductor which threads all of the driving cores 12, that conductor is also used as a sensing line to sense the changes in flux in the driving cores. The output of amplifier 70 is connected through AND gate 72 which is connected and adapted to be clocked by a clock source 74.

Other conductors, such as those channeling current from sources 14, 16, 18, and 20 could be used to sense a change in flux in the driving cores.

Because a voltage is generated across the biasing source 60 by changes in the remanent state of the driving core, it may be desirable to connect in a balancing or bucking core 69 instead of connecting as shown by the dotted line 71.

The current source 67 (which may be integral with the other current sources, but separately switched) is adapted to apply magnetomotive force in magnitude and time sequence to oppose that portion of the voltage, across current source 60, which is generated by the change of remanent state of a driving core.

The current sources 62, 64, 66, 67, and 68 are connected to be controlled by a clock source 76, and the current source 30 is adapted to be controlled by a clock source 78. In a typical embodiment, all of the clock sources could be combined into one mechanism having a plurality of output terminals with synchronized but different time duration signals.

The computer control circuits of a computer are connected to control the current sources 62, 64, 66, and 68 and to control the current source 30 and the switching means 32A and 32B to select a predetermined one of the storage cores whose information is to be sensed.

Figure 2:
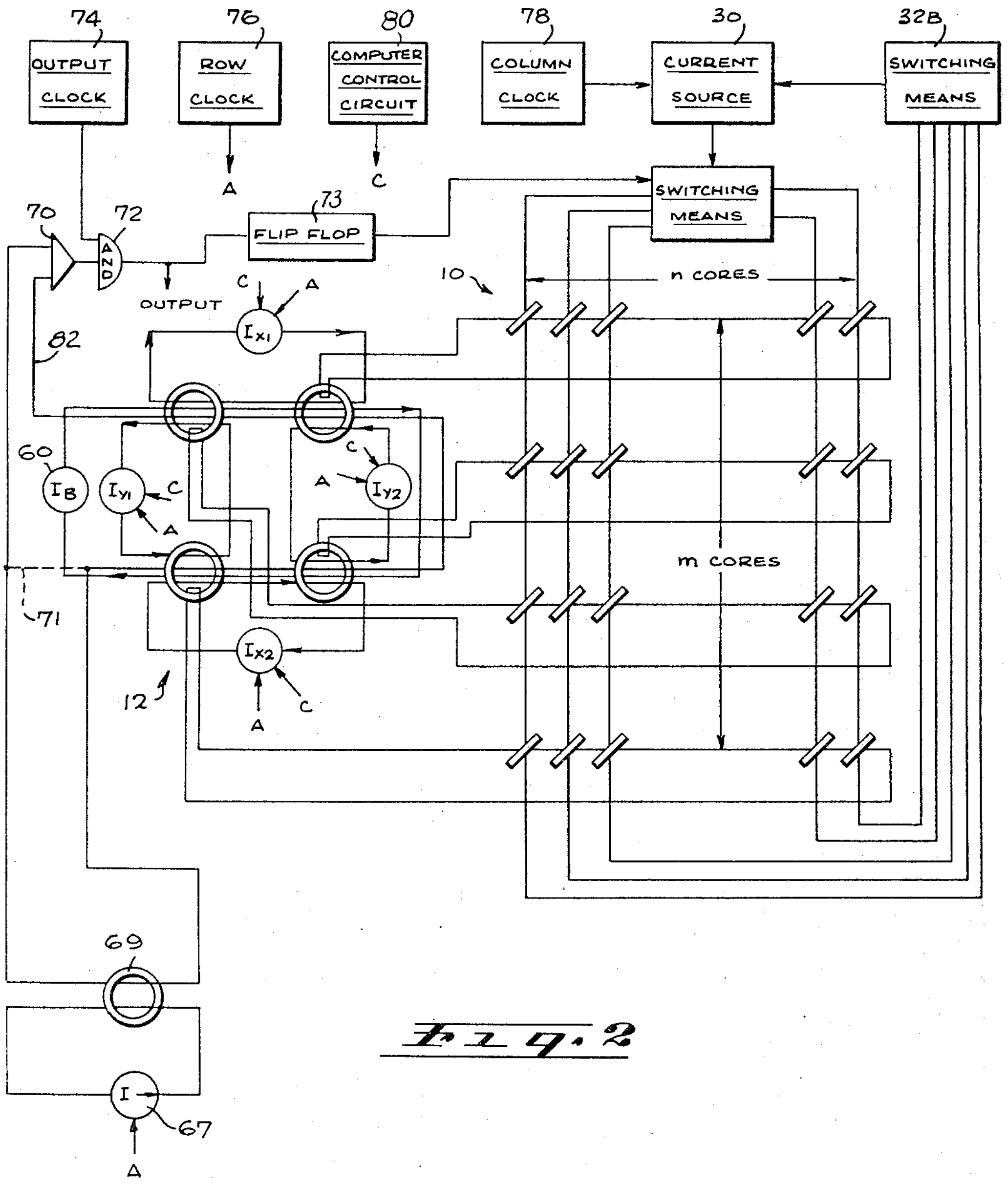
FIGURE 2 is a block diagram of a typical storage core matrix in which one set of storage cores is driven by each driving core and in which a separate sensing line threads the driving cores, and further showing the output signal as a voltage measured across the sensing line.

FIGURE 2 differs from FIGURE 1 in two respects. First a separate driving core is coupled to each row set of the storage cores 10, and second a sensing line or conductor 82 threads or loops the driving cores 12. The input terminals of the amplifier 70 is connected to the separate sensing line instead of being connected across the biasing current source 60. The balancing core 69 and current source 67 perform the same functions as in FIG. 1.

Figure 3:
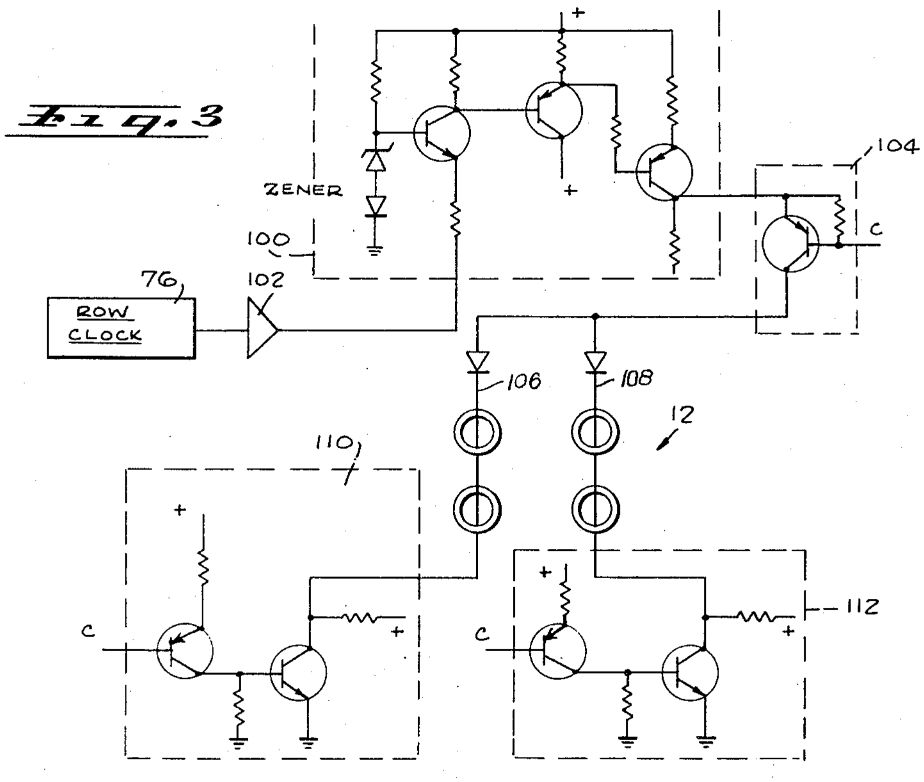
FIGURE 3 is a partly schematic diagram showing how the various column-sets of the storage cores and the column-sets and row-sets of typical driving cores may be driven.

In FIGURE 3 is shown a typical current source and a typical means of connection to the driving cores. The shown connections may be either row current source or column current source connections. The current source 100 is connected through an amplifier 102 to the clock source 76. A simple transistor switch 104 is connected in series with the current source 100 and is adapted to be controlled by the control logic 80 to switch the current connections into the two current paths 106 and 108. The particular current path 106 or 108 is then selected by the condition of the switching circuit 110 or 112, respectively, in response to signals from the control logic 80.

Figure 4:
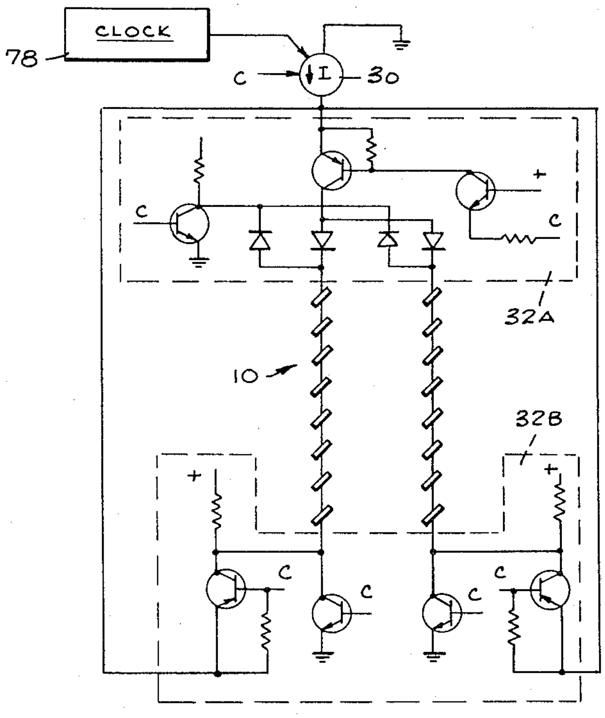
FIGURE 4 shows a circuit, partly schematic, showing a manner in which typical column-sets of storage cores may be driven by two-directional current.

A typical circuit for delivering two-directional current to the column sets of storage cores is shown in FIGURE 4.

Figure 5:
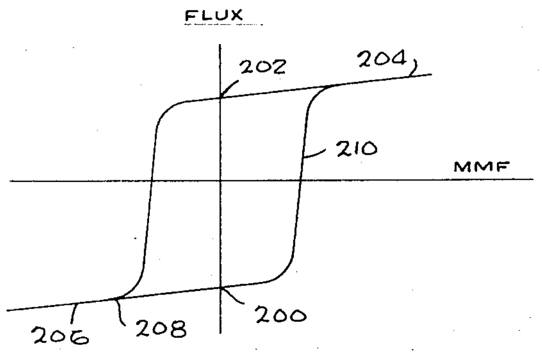
FIGURE 5 shows a typical hysteresis loop of the storage cores and driving cores used in the invention.

The operation of the circuits on FIGURES 1 and 2 may best be described in connection with the typical hysteresis loop of FIGURE 5 and the waveform of FIGURES 6A through 6E.

To store a "1" into a particular storage core, the storage core is driven into a predetermined remanent state, for example that indicated at 200. To store a "0" in a storage core, the core is maintained at its other remanent state, indicated at 202. To read out a storage core, the magnetomotive force applied to the storage core by the coincidence of currents flowing therethrough drives the core into a saturated region of "0" storage—for example to position 204. If the core stored a "1," the remanent state of the core would shift and a voltage would be induced onto the driving lines. If a "0" was stored in the core, the flux value would not shift substantially, and substantially no voltage would be induced onto the driving lines.

The driving cores 12 are each biased to a predetermined saturated condition—for example, position 206. The coincidence of selecting currents within a driving core causes its operating position to be driven for example to position 204, thereby changing its remanent state and driving a current down the line which links or loops a predetermined set of storage cores. When the coincident currents are removed from the driving cores, the remanent state returns to its original value which generates a reset current in the loop which links the storage cores. The reset current may, in a particular embodiment, be accomplished in two time-separated steps, as shown and described in United States patent application Ser. No. 529,319 filed Feb. 23, 1966, by Richard P. Shively for a "Linear Select Device." Under those conditions, the first step might be to remove a portion of the magnetomotive force or driving current which drives the driving cores to cause the state of the driving cores to be changed to the position—for example—of 202. A second step might be to remove additional magnetomotive force to change the operating condition to the point represented by 208, then a third step might be to remove the remaining magnetomotive force (except for the biasing magnetomotive force) to change the state of the driving core back to its bias state at 206.

The balancing core 69 is driven by current source 67 to change the MMF in synchronism with that of a selected driving core which is being switched.

It may be appreciated that the change in remanent state of the driving cores does not change instantaneously. The applied magnetomotive force changes very rapidly, but the flux rate of change depends upon the magnitude of the applied magnetomotive force and the natural time constant of the driving cores. Should the remanent state of a storage core change while the driving core is in its saturated condition, the magnetomotive force supplied back to the driving core would be altered slightly but the flux change would be minimal and the voltage induced into a sensing line or into the biasing line would be negligible. However, should the remanent state of the storage core change when it should change, i.e. during the period of rapid change while the condition of the driving core is in the steep portion of the hysteresis loop, e.g., at 210, a significant voltage or counter EMF would be induced back into a sensing line or into one of the biasing lines or current driving lines of the driver cores. The change in voltage could be sensed and gated to generate an output signal which indicates the presence of a "1" in the storage core which is being interrogated. Should no counter EMF from the storage core appear, when the sensing line is gated, a "0" in the interrogated core would be indicated.

Figures 6A, 6B, 6C, 6D, 6E:
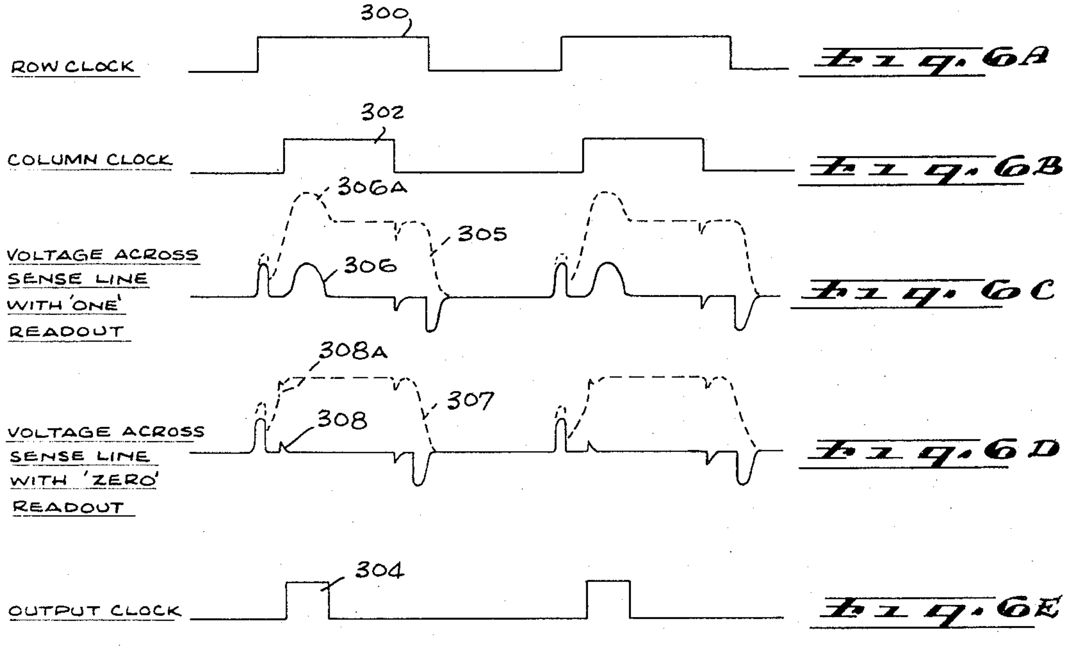
FIGURES 6*a*–6*e* are a series of signal timing diagrams showing typical signals at various positions in the circuits.

Consider that it is desired to determine whether a "1" or "0" is stored in storage core 53 of FIGURE 1. To make that determination, a current must be delivered by driving core 16 through loop 24 in coincidence with current of the proper plurality from current source 30 through switching means 32A and 32B. The control logic C sends a signal to current source 30 and to switching means 32A and 32B, as well as to the current sources 64 and 68. The clock source 76 generates the signal 300 which is shown in FIGURE 6A. To cause current from current sources 64 and 68 to be channeled in coincidence through driving core 16 to cause the operating condition of core 16 to move—for example—from 206 to 204.

Immediately afterward, clock sources 78 and 74 are energized. The signal of clock source 78 is shown at 302 in FIGURE 6B and the signal of clock source 76 is shown at 304 in FIGURE 6E.

The switching of remanent states of driving core 16 causes a current pulse to be sent through the loop 24. The clock 302 causes current to be sent through the column which includes storage core 53. Storage core 53 is then interrogated. If core 53 is already in its "0" state, it does not change remanent state but merely shuttles. If core 53 is in its "1" state, its remanent state is switched which wuold cause a signal to be generated in loop 24 and transformed back through driving core 16 to appear across the bias source 60. The clock signal 304 has opened gate 72 whereby the transformed back signal is produced at the output of AND gate 72.

Should a "1" be stored in storage core 53, a signal similar to that shown in FIGURE 6C would appear across biasing source 60. With core 69 in the circuit, the signal at 306 would be the signal that indicates the existence of a "1" in core 53. With the circuit shown by dotted line 71, the signal at 306A would be observed.

With core 69 in the circuit, should a "0" be stored in core 53, the absence of a signal at 308 (except for a small signal due to shuttle flux) would be shown at 308 in FIGURE 6D. With the circuit shown by dotted line 71, the signal at 308A would be observed.

Should it be desired to interrogate core 54 instead of core 53, the current direction from current source 30 through the column of cores 53 and 54 would be reversed but the current direction through loop 24 would not be reversed.

In the circuit of FIGURE 2, only a unidirectional column current is applied from current source 30 for reading. The output signal applied to output amplifier 70 is obtained from a separate sensing line. It is to be noted that additional noise signals other than that shown in FIGURES 6C and 6D would appear on the line. Less noise would appear where a separate sensing line 82 is used than would appear when the output signal is taken across the biasing source 60. Further, by the use of noise cancelling windings and the like, the noise could substantially be reduced.

To reset the storage cores, resetting current, in the usual manner is channeled by switching means 32A and 32B, in response to the condition of flip flop 73, to enhance or inhibit resetting MMF generated during the reset cycle of the driving cores.

Although the invention is shown and described in detail above, it is not intended that the invention should be limited by that description but only in accordance with the spirit and scope of the appended claims. Further, it may appear that more than one invention has been described and claimed, in which event it is intended that patent protection should be obtained upon each of the inventions and the concepts contained therein.

We claim:

1. In combination:

at least one ferromagnetic storage core;

at least one ferromagnetic driving core, each said driving core electromagnetically coupled to predetermined ones of said storage cores;

biasing means, electromagnetically coupled to said driving cores to apply biasing magnetomotive force to said driving cores;

at least one switching means, electromagnetically coupled to said driving cores to switch the remanent state of a selected one of said driving cores;

at least one storage core switching means, electromagnetically coupled to said storage cores to drive a selected one of said storage cores toward a first predetermined remanent state upon coincidence of the delivery of current to said selected storage core from said driving core and from said storage core switching current means; and sensing means for sensing changes in remanent state of said selected storage core including means for sensing changes in magnetic flux which are induced into the said selected driving core by the change in the remanent state of said selected storage core during changes of remanent state of said selected driving core.

2. A device as recited in claim 1 in which said biasing means is a biasing current source and conducting means connected to said biasing current source to cause biasing current to thread said driving cores, and in which said sensing means comprises at least means for measuring the voltage across said biasing current source.

3. A device as recited in claim 1 and further comprising means for gating said sensing means.

4. A device as recited in claim 3 in which said sensing means comprises at least one sensing line, threading said driving cores, and means for measuring the voltage on said sensing lines.

5. A device as recited in claim 1 and further comprising gating means connected to control the measurement of changes of electromagnetic flux by said sensing means; and timing means connected to control said switching means, said storage core switching means, and said gating means.

6. A device as recited in claim 5 in which said sensing means comprises at least one sensing line threading said driving cores, and means for measuring a voltage on said sensing line.

7. A device as recited in claim 1 in which said sensing means comprises at least one sensing line threading said driving cores, means for measuring voltage on said sensing line, and balancing core means for canceling voltage on said sensing line which is caused by switching of said driving core.

8. In combination:

a plurality of ferromagnetic storage cores;

a plurality of ferromagnetic driving cores;

means for electromagnetically coupling of said driving cores to predetermined storage cores;

coincident current means, electromagnetically coupled to said storage cores, including switching means adapted to switch current from said coincident current means to selected pluralities of said storage cores;

magnetomotive force biasing means, electromagnetically coupled to said driving cores for biasing said driving cores into a first remanent state;

switching magnetomotive force means adapted selectively to apply magnetomotive force to said driving cores in opposition to said magnetomotive force biasing means to switch the flux of a selected one of said driving cores into a second remanent state to drive a selected plurality of said storage cores; and means for sensing changes of remanent state of said storage cores, including means for sensing and measuring changes in magnetic flux which are induced into said driving cores by the changes in the remanent states of said storage cores when said selected driving core is changing remanent state.

9. A device as recited in claim 8 and further comprising gating means connected to said means for sensing changes in flux; and timing means connected to control said coincident current means, said switching magnetomotive force means, and said gating means.

10. A device as recited in claim 9, in which said storage cores are each assigned at least a row designation and a column designation, and in which said coincident current means is adapted to be switched to a predetermined column of said storage cores to apply a partial switching magnetomotive force thereto, the remainder of the magnetomotive force needed to switch a predetermined storage core being supplied from said selected driving core.

11. A device as recited in claim 9 in which said storage cores are each assigned a row designation, a column designation, and a stack designation, and in which current from said coincident current means is adapted to be switched to a selected column and to a selected stack of said storage cores to apply a partial switching magnetomotive force thereto, the remainder of the magnetomotive force needed to switch a selected storage core being supplied from said selected driving core.

12. A device as recited in claim 9 in which said means for sensing changes in flux comprises at least means for measuring the signal across said magnetomotive force biasing means during the application of coincident current to said storage cores.

13. A device as recited in claim 9 in which said means for sensing changes in flux comprises at least one sensing line, threading said driving cores, and means for measuring the voltage on said sensing lines.

14. In combination:

a plurality of ferromagnetic storage cores;

a plurality of ferromagnetic driving cores;

means for electromagnetically coupling said driving cores to predetermined pluralities of said storage cores to cause the magnetomotive force applied by said driving cores to said predetermined storage cores to shuttle when the flux remanent state changes in said driving cores;

magnetomotive means for selectively applying magnetomotive force to said driving cores to cause the remanent state of the flux in one selected driver core to be changed;

at least one coincident current source, and switching means connected to said coincident current sources;

means for selectively electromagnetically coupling said coincident current sources, through said switching means, to predetermined combinations of said storage cores to cause the remanent state of only one of said storage cores to be forced into a predetermined remanent state by coincidence of magnetomotive force applied by current from said coincident current sources and current from said selected driving core; and means for sensing changes of remanent state in said storage cores, including means for sensing and measuring changes in magnetic flux which are induced into said selected driving core by the change in the remanent state of said selected storage core while it is being changed from one remanent state to the other.

15. A device as recited in claim 14 in which said switching means is adapted to cause enhancing and inhibiting current to be coupled to said storage cores to control the magnetomotive force therein during resetting of said storage cores.

16. A device as recited in claim 14 in which said magnetomotive means includes magnetomotive biasing means, electromagnetically coupled to said driving cores, and said means for sensing changes of flux in said selected driving core comprises at least means for measuring the signal across said magnetomotive biasing means.

17. A device as recited in claim 16 and further comprising a balancing core for canceling voltage induced across said magnetomotive biasing means by changes in remanent state of said driving cores.

18. A device as recited in claim 17 in which said magnetomotive biasing means is a biasing current source electromagnetically coupled to said driving core; and further comprising:

gating means, connected to said means for measuring the voltage across said biasing current source; and timing means, connected to control the application of said magnetomotive means, the application of current from said coincident current sources, and the gating of said gating means.

19. A device as recited in claim 18 in which said storage cores are each assigned at least one set designation:

there is one driving core associated with each different said set of said storage cores; and each of said driving cores is electromagnetically coupled to its associated said set of said storage cores to cause the magnetomotive force applied to said associated storage cores to change when the remanent flux state changes in said selected driving core.

20. A device as recited in claim 18 in which said storage cores are each assigned at least a first set designation and a second set designation;

each of said driving cores is associated with two of said first sets of said storage cores;

said driving cores are electromagnetically coupled to their associated said first sets of said storage cores to cause the magnetomotive force applied to said associated storage cores to change when the remanent flux state changes in said driving cores;

said switching current source and switching means are adapted to drive current in two directions through said storage cores; and said means for electromagnetically coupling said coincident current sources through said switching means to predetermined combinations of said storage cores comprises means for coupling said coincident current sources to selected said second sets of said storage cores, and is adapted to cause the remanent state of one of said storage cores to be driven into a predetermined remanent state upon coincidence of a read pulse from said selected driving core through said one storage core with current driven in a first direction through said one storage core by said coincident current source, and is adapted to cause the remanent state of a second one of said storage cores to be driven into a predetermined remanent state upon coincidence of a read pulse from said selected driving core through said second one of said storage cores with current driven in a second direction through said second one of said storage cores by said coincident current source.

21. A device as recited in claim 14 in which said magnetomotive means includes a biasing magnetomotive means electromagnetically coupled to said driving cores, and switching magnetomotive means adapted selectively to oppose the magnetomotive force of said biasing magnetomotive means to switch the remanent state of said selected driving core.

22. A device as recited in claim 21 and further comprising:

gating means, connected to be responsive to said means for sensing flux changes; and timing means, connected to control the application of said switching magnetomotive means, the application of current from said coincident current sources to said storage cores, and the gating of said gating means.

23. A device as recited in claim 22 in which said storage cores are each assigned at least a first set designation;

there is one driving core associated with each different said set of said storage cores; and each of said driving cores is electromagnetically coupled to its associated said set of said storage cores to cause the magnetomotive force applied to said associated storage cores to change when the remanent flux state changes in said selecting driving core.

24. A device as recited in claim 23 in which said driving cores are arranged in at least second sets and third sets; and said switching magnetomotive means comprises a third current source, a fourth current source, and means for electromagnetically coupling said third and fourth current source to said driving cores to cause one of said driving cores to switch when both said third current source and said fourth current source apply current to that particular driving core.

25. A device as recited in claim 24 in which:

said biasing magnetomotive means comprises a biasing current source and means for conducing current from said biasing current source through said driving core; and further comprising a first plurality of conductors with each conductor threading a separate said second set of said driving cores, a second plurality of conductors with each threading a separate said third set of said driving cores, first switching means connected between said third current source and said first plurality of conductors selectively to channel current into a selected one of said first plurality of conductors to apply magnetomotive force, to the said second set associated with the selected one of said first plurality of conductors, in opposition to the magnetomotive force generated by said biasing magnetomotive means, and second switching means connected between said fourth current source and said second plurality of conductors selectively to channel current from said fourth current source to a selected one of said second plurality of conductors to generate magnetomotive force in the said third set of driving cores, associated with that selected one of said second plurality of conductors, in opposition to the magnetomotive force generated by said magnetomotive means.

26. A device as recited in claim 22 in which said storage cores are each assigned at least a first set designation and a second set designation;

each of said driving cores are associated with two of said first sets of said storage cores;

said driving cores are electromagnetically coupled to their associated first sets of said storage cores to cause the magnetomotive force applied to said associated storage cores to change when the remanent flux state changes in said driver cores;

said coincident current sources and said switching means are adapted to drive current in two directions; and said means for electromagnetically coupling said coincident current sources through said switching means to said storage cores is adapted to couple said coincident current sources to selected said second sets of said storage cores to cause the remanent state of one of said storage cores to be driven into a predetermined remanent state upon coincidence of a read pulse from said driving cores through said one storage core with current driven in a first direction through said one storage core by said coincident current source and said switching means, and to cause the remanent state of a second one of said storage cores to be driven into a predetermined remanent state upon coincidence of a read pulse from said driving cores through said second one of said storage cores with current driven in a second direction through said second one of said storage cores by said coincident current source.

27. A device as recited in claim 26 in which said driving cores are arranged in third sets and fourth sets; and said switching magnetomotive means comprises a third current source, a fourth current source, and means for electromagnetically coupling said third and fourth current sources to said driving cores to cause one of said driving cores to switch when current from both said third current and said fourth current source are applied to that particular driving core.

28. A device as recited in claim 27 in which:

said biasing magnetomotive means comprises a biasing current source and means for conducting current from said biasing current source through said driving cores; and further comprising a first plurality of conductors each threading a different said third set of said driving cores, a second plurality of conductors each threading a separate said fourth set of said driving cores, first switching means connected between said third current source and said first plurality of conductors selectively to channel current into one of said first plurality of conductors to apply magnetomotive force to the said third set, associated with that selected one of said first plurality of conductors, in opposition to the magnetomotive force generated by said biasing magnetomotive means, and second switching means connected between said fourth current source and said second plurality of conductors selectively to channel current from said fourth current source into one of said second plurality of conductors to apply magnetomotive force, to said fourth set of driving cores associated with that selected one of said second plurality of conductors, in opposition to the magnetomotive force generated by said biasing magnetomotive means.

29. A device as recited in claim 14 in which said magnetomotive means comprises biasing magnetomotive means and switching magnetomotive means, coupled to said driving cores; said switching magnetomotive means being adapted to be applied to a selected one of said driving cores in opposition to the magnetomotive force of said biasing magnetomotive means to change the remanent state of said selected driving core from a first to a second remanent state, and adapted to be removed in two time-separated steps.

30. A device as recited in claim 29 in which said switching magnetomotive means is means for applying a plurality of coincident currents to said selected driving core.

31. A device as recited in claim 30 in which at least a portion of the current from at least one of said last named coincident currents is first removed, then the remainder of the current of said last named coincident currents is next removed.

32. A device as recited in claim 14 in which said means for sensing flux changes comprises a sensing line, threading said driving cores, and means for sensing voltage on said sensing line.

33. A device as recited in claim 32 and further comprising:

gating means, connected to said means for sensing voltage on said sensing line;

a balancing core, connected to said sensing line in a polarity to generate signals in said sensing line in opposition to signals in said line due to switching of said driving cores; and timing means, connected to control the application of said magnetomotive means, the application of current from said coincident current sources, the gating of said gating means, and the generation of a signal by said balancing core.

34. A device as recited in claim 33 in which said storage core are each assigned at least a first set designation;

there is one driving core associated with each different said first set of said storage cores; and each of said driving cores is electromagnetically coupled to its associated said first set of said storage cores to cause the magnetomotive force applied to said associated storage cores to change when the remanent flux state changes in said selective driving core.

35. A device as recited in claim 34 in which said driving cores are arranged in at least third sets and fourth sets; and said magnetomotive means comprises a biasing current source, a third current source, a fourth current source, and means for electromagnetically coupling said biasing, third, and fourth current sources to said driving cores to cause one of said driving cores to switch when current from both said third current and said fourth current sources are applied to that particular row-select core in opposition to the effect of current from said biasing current source.

36. A device as recited in claim 35 in which:

said means for electromagnetically coupling said biasing current source to said driving cores comprises at least one bias conductor threading said driving cores and connected to said biasing current source; and in which said means for electromagnetically coupling said third and fourth current sources to said driving cores comprises a first plurality of conductors each threading a different said third set of said driving cores, a second plurality of conductors each threading a separate said fourth set of said driving cores, first switching means connected between said third current source and said first plurality of conductors selectively to channel current into one of said first plurality of conductors to apply magnetomotive force to the said third set of driving cores, associated with that selected one of said first plurality of conductors, in opposition to the magnetomotive force generated by said biasing magnetomotive means, and second switching means connected between said fourth current source and said second plurality of conductors selectively to channel current from said fourth current source to one of said second plurality of conductors to generate magnetomotive force in the said fourth set of driving cores, associated with the particular selected one of said second plurality of conductors, in opposition to the magnetomotive force generated by said biasing magnetomotive means.

37. A device as recited in claim 33 in which said storage cores are each assigned at least a first set designation and a second set designation;

each of said driving cores is associated with two of said first sets of said storage cores;

said driving cores are electromagnetically coupled to their associated said first sets of said storage cores to cause the magnetomotive force applied to said associated storage cores to change when the remanent flux state changes in said driving cores;

said coincident current source and switching means are adapted to drive current in two directions; and said means for electromagnetically coupling said coincident current sources through said switching means to predetermined combinations of said storage cores comprises means for coupling said coincident current sources to selected one of said second sets of storage cores, and is adapted to cause the remanent state of one of said storage cores to change into a predetermined remanent state upon coincidence of a read pulse through said one storage core from said driving cores with current driven in a first direction through said one storage core from said coincident current source, and to cause the remanent state of a second one of said storage cores to change into a predetermined remanent state upon coincidence of a read pulse through said second one of said storage cores from said driving cores with the current driven in a second direction through said second one of said storage cores from said coincident current source.

38. A device as recited in claim 37 in which said driving cores are arranged in at least third sets and fourth sets; and said magnetomotive means comprises a biasing current source, a third current source, a fourth current source, and means for electromagnetically coupling said biasing, third, and fourth current sources to said driving cores to cause said selected one of said driving cores to switch when current from both said third current source and said fourth current source are applied to that particular driving core in opposition to current from said biasing current source.

39. A device as recited in claim 38 in which:

said means for electromagnetically coupling said biasing current source to said driving cores comprises at least one bias conductor threading said driving cores and connected to said biasing current sources; and in which said means for electromagnetically coupling said third and fourth current sources to said driving cores comprises a first plurality of conductors each threading a different said third set of said driving cores, a second plurality of conductors each threading a separate said fourth set of said driving cores, first switching means connected between said third current source and said first plurality of conductors selectively to channel current into one of said first plurality of conductors to apply magnetomotive force to the said third set of driving cores, associated with that selected conductor, in opposition to the magnetomotive force generated by said biasing magnetomotive means, and second switching means connected between said fourth current source and said second plurality of conductors selectively to channel current from said fourth current source to a selected one of said second plurality of conductors to generate magnetomotive force in the said fourth set of driving cores associated with the particular selected one of said second plurality of conductors, in opposition to the magnetomotive force generated by said biasing magnetomotive means.

40. A device as recited in claim 39 and further comprising means for removing at least a portion of said current from at least one of said third and fourth current sources in at least two time-separated steps.

41. A device as recited in claim 40 in which the current from at least a portion of at least one of said current sources, chosen from the group consisting of said third current source and said fourth current source, is first removed, a second portion of the current from the current sources of said group is next removed, then the remainder of the current from said current sources of said group is removed.

42. A coincident current memory comprising:

at least rows and columns of ferromagnetic storage cores and at least said rows driven by driving cores; and means for sensing changes in magnetic flux which are induced into said driving cores by the changes in the remanent states of said storage cores during coincident switching of one of said storage cores including timing means to synchronize the reading of said sensing means to a time when the flux is changing, in one of said driving cores, from one remanent state to another.

43. A device as recited in claim 42 and further comprising gating means connected to said means for sensing changes in flux.

44. A device as recited in claim 43 in which said row-select cores have at least a bias winding, and in which said sensing means comprises:

means for measuring the voltage induced on said bias winding.

45. A device as recited in claim 43 in which said driving cores are threaded by a sensing line, and in which said sensing means comprises means for measuring the voltage induced on said sensing line.

46. A device as recited in claim 45 in which said sensing line threads said driving cores in a pattern to reduce extraneous noise signals.

47. A device as recited in claim 42 in which said driving cores have at least a bias winding, and in which said sensing means comprises means for measuring the voltage induced on said bias winding.

48. A device as recited in claim 42 in which said driving cores are each threaded by a sensing line and in which said sensing means comprises means for measuring the voltage on said sensing line.

49. A device as recited in claim 48 in which said sensing line threads said driving cores in a pattern to reduce extraneous noise signals.

References Cited

UNITED STATES PATENTS

| | | | |
|---|---|---|---|
| 3,011,158 | 11/1961 | Rogers | 340—174 |
| 3,341,830 | 9/1967 | Conrath | 340—174 |
| 3,388,387 | 6/1968 | Webb | 340—174 |

BERNARD KONICK, *Primary Examiner.*

GARY M. HOFFMAN, *Assistant Examiner.*